(12) United States Patent
Mercier et al.

(10) Patent No.: US 12,337,988 B2
(45) Date of Patent: Jun. 24, 2025

(54) ROTARY WING AIRCRAFT PROVIDED WITH A TRANSMISSION SYSTEM COMPRISING AN EMERGENCY ELECTRIC MOTOR

(71) Applicant: AIRBUS HELICOPTERS, Marignane (FR)

(72) Inventors: Christian Mercier, La Fare les Oliviers (FR); Jean-Victor Lapeyre, Lancon-Provence (FR); Marc Gazzino, Marseilles (FR)

(73) Assignee: AIRBUS HELICOPTERS, Marignane (FR)

( * ) Notice: Subject to any disclaimer, the term of this patent is extended or adjusted under 35 U.S.C. 154(b) by 40 days.

(21) Appl. No.: 16/950,044

(22) Filed: Nov. 17, 2020

(65) Prior Publication Data

US 2021/0229826 A1   Jul. 29, 2021

(30) Foreign Application Priority Data

Jan. 23, 2020 (FR) ..................... 2000635

(51) Int. Cl.
*B64D 35/08* (2006.01)
*B64C 27/12* (2006.01)
(Continued)

(52) U.S. Cl.
CPC .............. *B64D 35/08* (2013.01); *B64C 27/12* (2013.01); *B64C 27/64* (2013.01); *B64D 27/24* (2013.01);
(Continued)

(58) Field of Classification Search
CPC ........ B64D 35/08; B64D 27/24; B64D 31/10; B64D 2027/026; B64D 2221/00; B64C 27/12; B64C 27/14
See application file for complete search history.

(56) References Cited

U.S. PATENT DOCUMENTS 2,465,703 A * 3/1949 Allen ...................... B64C 27/26
                                                    416/88
3,455,182 A * 7/1969 Kelley .................... B64C 27/12
                                                    244/17.11
(Continued)

FOREIGN PATENT DOCUMENTS

CN     109689504 A    4/2019
EP       2735507 A1   5/2014
(Continued)

OTHER PUBLICATIONS

French Search Report for French Application No. FR2000635, Completed by the French Patent Office, Dated Sep. 11, 2020, 9 pages.

(Continued)

*Primary Examiner* — Ashesh Dangol
(74) *Attorney, Agent, or Firm* — Brooks Kushman P.C.

(57) ABSTRACT

The present invention relates to an aircraft provided with a rotary airfoil, a power plant and an assistance system having an electric motor. The power plant comprises a power transmission box and at least one heat engine. The aircraft includes at least one accessory which is set in motion by a secondary output shaft of the power transmission box. The assistance system is provided with a mechanical connection module having a connection shaft which is connected to the secondary output shaft. A first connection member is connected to said at least one accessory and is connected by a first mechanical link internal to the connection shaft, a second connection member being connected to the electric motor and connected by a second mechanical link internal to the connection shaft.

20 Claims, 5 Drawing Sheets

(51) Int. Cl.
    *B64C 27/64*     (2006.01)
    *B64D 27/02*     (2006.01)
    *B64D 27/24*     (2024.01)
    *B64D 31/10*     (2006.01)

(52) U.S. Cl.
    CPC ............ *B64D 31/10* (2013.01); *B64D 27/026* (2024.01); *B64D 2221/00* (2013.01)

(56) References Cited

U.S. PATENT DOCUMENTS

| | | |
|---|---|---|
| 9,045,223 B2 | 6/2015 | Connaulte et al. |
| 2011/0121127 A1 | 5/2011 | Certain |
| 2012/0025032 A1 | 2/2012 | Hopdjanian et al. |
| 2013/0323050 A1* | 12/2013 | Kleckler ............... B64C 11/385 416/1 |
| 2014/0263820 A1 | 9/2014 | Smith et al. |
| 2015/0125258 A1 | 5/2015 | Certain |
| 2016/0016670 A1 | 1/2016 | Sautreuil et al. |
| 2016/0059957 A1 | 3/2016 | Smith et al. |
| 2016/0299169 A1* | 10/2016 | Heuver ..................... G01P 3/44 |
| 2017/0174355 A1 | 6/2017 | Waltner et al. |
| 2017/0225573 A1* | 8/2017 | Waltner .................. B60L 50/16 |
| 2018/0362152 A1 | 12/2018 | Smith et al. |
| 2019/0234312 A1 | 8/2019 | Eckhoff et al. |
| 2019/0264750 A1* | 8/2019 | Iyer ........................... F16D 3/72 |
| 2020/0144810 A1* | 5/2020 | Zhou ........................ H02M 1/32 |
| 2020/0248760 A1* | 8/2020 | Olson ....................... F16D 1/10 |

FOREIGN PATENT DOCUMENTS

| | | |
|---|---|---|
| EP | 2735508 A1 | 5/2014 |
| EP | 2974964 A1 | 1/2016 |
| EP | 3434587 A1 | 1/2019 |
| EP | 3524519 A1 | 8/2019 |
| FR | 2952907 A1 | 5/2011 |
| FR | 2962404 A1 | 1/2012 |

OTHER PUBLICATIONS

First Office Action for Chinese Application No. 202011329027.7, dated Jun. 4, 2024, 24 Pages.
"Wheel Loader design", edited by Department of Engineering Machinery, Jilin University of Technology, p. 121, China Architecture & Building Press, Nov. 1982, first edition.
1st Chinese Office Action, English Translation.
CN109689504A, English Abstract and U.S. Equivalent U.S. Pub. No. 2019/0234312.
"Wheel Loader Design" Non-Patent Literature document, English Machine Translation.

* cited by examiner

ROTARY WING AIRCRAFT PROVIDED WITH A TRANSMISSION SYSTEM COMPRISING AN EMERGENCY ELECTRIC MOTOR

CROSS REFERENCE TO RELATED APPLICATION

This application claims foreign priority benefits under 35 U.S.C. § 119(a)-(d) to FR Application 2000635 filed Jan. 23, 2020, which is hereby incorporated by reference in its entirety.

BACKGROUND OF THE INVENTION

(1) Field of the Invention

The present invention relates to a rotary wing aircraft having at least one heat engine provided with a transmission system fitted with an emergency electric motor.

(2) Description of Related Art

A rotary wing aircraft is conventionally equipped with at least one main rotor to ensure its lift or even its propulsion and generally with a yaw movement control system. Such a yaw movement control system can for example comprise an auxiliary rotor located at the rear of the aircraft.

In order to drive the main rotor and, where appropriate, the tail rotor, in rotation, the aircraft has a power plant, which can include one or more heat engines.

Thus, an aircraft has one or more heat engines so as to set the main rotor and the tail rotor in motion via at least one power transmission box.

The expression "heat engine" denotes turboshaft engines or even all internal combustion engines, in particular piston engines, which can be used in such a power plant. The expression "heat engine" is in contrast to the expression "electric motor," which qualifies motors consuming only electrical energy.

Thus, an aircraft has at least one heat engine setting at least the main rotor in motion via at least one main power transmission box.

A main power transmission box thus has a power input shaft which is mechanically connected by a mechanical power input link to the heat engine. In addition, the main power transmission box has at least one main power output which is connected to a rotor mast of the main rotor. Optionally, the main power transmission box has a rear power output which is connected to a tail rotor by a rear mechanical connection, this rear mechanical connection possibly comprising at least one rear shaft and/or power transmission box.

Furthermore, the pitch of the main rotor blades can be controlled by flight control chains provided with hydraulic servo controls. Consequently, the main power transmission box can comprise at least one secondary output shaft setting in motion a hydraulic pump of a hydraulic circuit supplying the servo controls with fluid.

Thus, during a phase of normal operation, the heat engine (s) set the various moving parts of the main power transmission box in motion. As a result, the main power transmission box drives the rotation of the main rotor, the setting in motion of the hydraulic pump of the flight control system or even the rotation of the tail rotor.

If a heat engine stops following a breakdown, the main rotor may no longer be driven in rotation by the power plant. The pilot then maneuvers the flight controls to place the aircraft in an autorotation flight phase.

An autorotation flight phase corresponds to a particular flight phase in which the aircraft flies downhill without motive power. In this case, the rotation of the main rotor is generated by the air flow passing through the main rotor, which allows the aircraft to remain maneuverable. The autorotation flight phase allows a safe landing.

However, this entry into the autorotation flight phase must be done within a very short time, of the order of 1 to 2 seconds after the onset of the failure of a heat engine and according to a specific procedure aimed at maintaining the rotor at a predetermined rotational speed. Without rapid action by the pilot, the speed of rotation of the main rotor of the aircraft decreases very quickly until this main rotor stalls. The autorotation flight phase must then be the subject of recurrent training exercises by the pilot. For this reason, the flight envelope of an aircraft can be reduced.

One solution envisaged to improve aircraft performance in this respect is the use of a "hybrid" power plant. Such a "hybrid" power plant comprises at least one electric motor or one electric machine for setting the main power transmission box in motion via a usual power input or a dedicated power input.

Document FR2952907 describes a hybrid power plant implemented on an aircraft having a single heat engine. The aircraft thus comprises a first electric motor which is mechanically linked to an input of a power transmission box driving the main rotor of the aircraft in rotation and a second electric motor which is mechanically linked to its tail rotor. These electric motors can operate in motor mode to drive the rotors or in electric generator mode to transform mechanical energy into electrical energy as well as to serve as a retarder for the rotors or as a heat engine.

Document FR2962404 describes the electrical architecture of a hybrid power plant of a rotary wing aircraft. This power plant has at least one heat engine and at least one electric motor as well as a main electrical network and an auxiliary electrical network.

Document U.S. Pat. No. 9,045,223 describes a rotary wing aircraft having a single heat engine, at least one electric machine and a main power transmission box. For example, the electric machine can be linked to the main power transmission box, to the heat engine or directly to the main rotor of the aircraft. The aircraft has a monitoring means for monitoring a monitoring parameter in order to detect a possible failure of the heat engine. Consequently, a control means is in communication with the monitoring means so as to control the electric machine in the event of failure of the heat engine.

In particular, according to document U.S. Pat. No. 9,045,223 and after detection of this failure, the electric machine can be requested to operate in motor mode in order to supply auxiliary mechanical power to the main rotor to keep it at a speed of rotation allowing an autorotation flight phase to be initiated. This supply of auxiliary power makes it possible to reduce the deceleration of the main rotor so as to give the pilot greater flexibility in the maneuver. The entry into the autorotation flight phase of the aircraft is then faster and/or easier for the pilot.

A drop in main rotor power, via a reduction in the rotational speed of the main rotor, can also be detected during the landing phase as such. The electric machine can then be controlled to operate in motor mode so as to provide auxiliary mechanical power to the main rotor. The pilot can then have additional energy available to perform a landing without abrupt impact on the ground and while limiting the sliding of the aircraft on the ground.

The electric machine can also be used before landing to provide additional power in order to avoid an obstacle.

Under these conditions, the electric machine can tend to optimize the maximum takeoff weight of the aircraft and/or the flight envelope of this aircraft.

Document EP 2 974 964 in turn discloses an electrical architecture of an aircraft comprising a power transmission assembly which is connected at least to one lift rotor and driven by at least one heat engine, this electrical architecture comprising a high-voltage electrical network including a main electric machine intended to be connected to this heat engine and a secondary electric machine intended to be connected to the power transmission assembly.

In addition, such an aircraft has a secondary electric machine 9 which can be mechanically connected to the power transmission box 61 or to an accessory box 62. Furthermore, each secondary electric machine 9 operates either in an electric motor mode during which the secondary electric machine 9 takes electrical energy to at least partially drive the power transmission assembly 60, or in an electric generator mode during which the secondary electric machine 9 is driven by the power transmission assembly 60 to generate electrical energy.

Documents US2016059957 and US2014263820 describe an aircraft provided with a heat engine connected to a power transmission box. This power transmission box may comprise an output setting a hydraulic pump in rotation. In addition, the aircraft may have an autorotation assistance system. The autorotation assistance system can be connected to a dedicated input of the power transmission box, and in particular directly, namely without intermediate gear. The autorotation assistance system can store energy during a phase of normal operation and can use this energy during a failure phase to transmit mechanical power to the power transmission box. According to the variant, the autorotation assistance system may comprise a reversible electric machine which can operate alternately in motor mode and in electric generator mode, a hydraulic motor or a mechanical power storage system such as a spring arrangement.

Documents US2018362152 and US2018362152 are also known.

Document US2017174355 departs from the invention by disclosing an electric assistance system for the tail rotor.

Document EP3524519 departs from the invention by disclosing a multi-engine aircraft comprising a monitoring system for determining an engine failure.

Document EP 2 735 508 departs from the invention, but in turn discloses an autorotation assistance system also having a system for detecting an engine failure. It in particular describes the use of speed sensors such as a tone wheel to monitor engine failures.

Document EP 2 735 507 also departs from the invention because it discloses another type of power plant for rotorcraft.

In this context, arranging an electric motor on a dedicated input of a power transmission box within a rotary wing aircraft involves designing a specific power transmission box.

In addition, arranging an electric motor within a rotary wing aircraft using an existing power input shaft involves developing a means of mechanical coupling between the electric motor and the heat engine(s). Such a means of mechanical coupling can be difficult to obtain because of the very different rotational speeds of the electric motor and of the heat engine(s).

BRIEF SUMMARY OF THE INVENTION

The object of the present invention is therefore to propose an innovative aircraft aimed at facilitating the control of the aircraft following a failure of at least one heat engine.

The invention relates to an aircraft provided with a rotary airfoil and a power plant. This power plant comprises a power transmission box provided with a main output shaft rotating the rotary airfoil. In addition, the power plant comprises at least one heat engine connected by a mechanical input link to an input shaft of the power transmission box. The aircraft comprises at least one accessory which is set in motion by a secondary output shaft of the power transmission box.

In addition, such an aircraft has an assistance system provided with a mechanical connection module having a connection shaft which is connected to the secondary output shaft. The assistance system has a first connection member which is connected to one or more accessories and is connected by a first internal mechanical link to the connection shaft. The mechanical connection module also has a second connection member which is connected to an electric motor and connected by a second internal mechanical link to the connection shaft.

According to the invention, such an aircraft is remarkable in that the electric motor is an irreversible motor operating only in motor mode, the electric motor being requested to set said main output shaft in motion in the event of failure of at least one heat engine via the mechanical connection module.

Such a type of motor in fact has the advantage of limiting the function of the electric motor to the assistance system only. The reliability of such a type of electric motor and of its management electronics is therefore optimal.

The expression "connection shaft which is connected to the secondary output shaft" means that a rotation of the secondary output shaft induces a rotation of the connection shaft and vice versa. For example, the connection shaft has intermediate splines which mesh with splines of the power transmission box.

When a heat engine breaks down, the electric motor can set the main output shaft in motion via the mechanical connection module to help the pilot enter the autorotation phase, and/or to manage this autorotation for example so as to avoid an obstacle and/or to land safely, according to the previous teachings and in particular according to the teaching of document U.S. Pat. No. 9,045,223.

In contrast, the assistance system proves relatively simple to arrange on a pre-existing aircraft architecture. This assistance system can in particular be arranged relatively easily on an aircraft by positioning the connection module kinematically between an existing accessory and the associated output shaft. The assistance system can then be a safe option which does not call into question the certification of the aircraft.

Indeed, the invention proposes to go against prejudices and to connect the electric motor not to a shared or dedicated power input shaft, but surprisingly to a secondary output shaft transmitting mechanical power coming from this power transmission box to an accessory. The mechanical connection module can actually be sized to be reversible, namely to transmit mechanical power via the connection shaft in two different directions.

Thus, in an optimal mode implemented except in the event of a breakdown of a heat engine, the mechanical connection module makes it possible to transmit mechanical power in a power receiving direction from the secondary output shaft to the connection shaft. In this case, the mechanical connection module receives mechanical power generated by the power transmission box.

Conversely, in a degraded mode implemented in the presence of a failure of a heat engine, the mechanical connection module transmits mechanical power in a motor direction from the connection shaft to the secondary output shaft. In this case, the mechanical connection module generates mechanical power consumed at least by the power transmission box for driving the rotary airfoil.

In addition, in degraded mode, the mechanical connection module can optionally allow the electric motor to set the accessory in motion.

The aircraft can also include one or more of the following features, taken alone or in combination.

In practice, the accessory or accessories can be chosen from the group comprising hydraulic pumps, mechanical fans, electric generators and pneumatic compressors.

In other words, the accessory or accessories must not be considered as lifting or propulsion means allowing the aircraft to fly and/or to keep itself in position in the air during a hovering phase. More precisely, the accessories therefore cannot be formed by a rotor, by a drive shaft of a rotor, by a pusher or tractor propeller or by a drive shaft of a propeller.

According to an alternative of the invention, the accessory or accessories may include a first hydraulic pump, the first hydraulic pump belonging to a hydraulic circuit of the aircraft, the hydraulic circuit being connected to a plurality of servo controls for controlling a pitch of the blades of the rotary airfoil.

According to one aspect, the hydraulic circuit may include a second hydraulic pump which is set in motion by the power transmission box, said first mechanical link has a disconnection system which is configured to disconnect the first hydraulic pump from the connection shaft in the event of a failure of a heat engine.

According to one aspect, the second mechanical link may include a freewheel configured to transmit mechanical power only from the electric motor to the connection shaft shaft.

A freewheel usually has a driving part and a driven part between which there is at least one connection member. When the driven part rotates at a faster speed than the driving part, the driving part and the driven part are not joined in rotation. The freewheel is said to be slipping in this configuration.

The freewheel can kinematically connect the connection shaft and the electric motor only in the event of a heat engine failure. In addition, in the event of failure or stopping of a heat engine and therefore of immobilization or slowing down of the driven part of the freewheel, the mechanical freewheel engages automatically as soon as the electric motor is in motion or the driving part reaches the rotational speed of the driven part.

The freewheel therefore makes it possible to transfer mechanical power to the power transmission box in the event of a failure of a heat engine and to avoid the driving of the electric motor by the power transmission box otherwise.

Alternatively, the electric motor can be a reversible electric machine. The electric machine can operate in an electric generator mode except in the event of failure of a heat engine. In this mode, this electric machine is driven by the power transmission box through the mechanical connection module to produce electrical energy. Conversely, the electric machine can operate in a motor mode in the presence of such a failure.

According to one aspect, the assistance system may include a monitoring computer connected to the electric motor.

The monitoring computer can be in communication with an engine computer of a heat engine. Such an engine computer is in fact able to determine that at least one heat engine has broken down in the usual way. Therefore, where appropriate, the engine computer can transmit a control signal to the monitoring computer when the engine computer detects such a failure.

In a complementary or alternative manner, according to one aspect, the assistance system may include a monitoring computer connected to the electric motor and to a sensor allowing detection of a failure of a heat engine, the monitoring computer being configured to request the operation of the electric motor if a said failure of a thermal engine is detected.

The assistance system can thus include its own sensor to detect a failure of a heat engine independently of the "engine loss" information coming from the engine computer. This feature makes it possible to be robust even in the event of a joint failure of a heat engine and its engine computer.

Independently of the source signaling a failure of a heat engine to the monitoring computer, when the monitoring computer receives a signal indicating the failure of a heat engine, this monitoring computer transmits an actuation signal to the electric motor. Such an actuation signal can take the form of an analog, digital or optical signal. The electric motor then generates motive power transmitted to the power transmission box so as to maintain the rotation of the rotary airfoil and to allow the pilot to widen his landing cone and/or to better control the autorotation.

Optionally, the monitoring computer can be called upon during a test procedure.

Thus, before starting the heat engine(s), a man-machine interface can be operated so as to transmit a control signal to the monitoring computer in order to set the electric motor in motion for a short time. For example, this test procedure is performed as long as the rotary airfoil is not rotating.

In a complementary or alternative manner, after starting the heat engine(s) and setting the rotary airfoil in rotation, the test procedure may include other steps. Thus, a man-machine interface can be operated to transmit a control signal to the monitoring computer in order to set the electric motor in motion at an idle speed which is lower than its nominal speed of rotation, allowing the rotary airfoil to be driven in rotation. Such rotation of the electric motor then makes it possible to verify that the system is operational and more particularly that, if applicable, the freewheel is functioning correctly.

Alternatively or in a complementary manner, such a test procedure can also be carried out automatically by the monitoring computer without requiring an action by a pilot of the aircraft via a man-machine interface.

According to one aspect, said sensor may include a speed sensor emitting a signal which varies as a function of the speed of rotation of the connection shaft.

For example, the sensor can be integrated into the mechanical connection module.

For example, the rotation speed sensor may include a tone wheel which is rotatably secured to the connection shaft and an inductive sensor arranged opposite the tone wheel According to one aspect, the assistance system may include motor equipment housing said electric motor.

Optionally, the same equipment item, referred to for convenience as "motor equipment," accommodates both the electric motor and, where appropriate, the monitoring computer.

According to one aspect, the mechanical connection module comprises a casing in which the connection shaft is at least partially located as well as the first mechanical link and the second connection member, said casing being fixed to the power transmission box, said accessory being fixed to said casing, said motor equipment being fixed to said casing.

Therefore, the assistance system can be relatively easily fixed to the power transmission box.

According to one aspect, the second mechanical link can include at least one speed reduction gear stage.

Each speed reduction gear stage may tend to align the rotational speed of the connection shaft with an objective rotational speed of the secondary output shaft and an input of the accessory. For example, the electric motor can have an output rotating at a speed of the order of 20,000 revolutions per minute and the connection shaft in turn rotates at a rotational speed of the order of 6,000 revolutions per minute.

Optionally, said at least one speed reduction gear stage comprises a first rotational speed reduction stage connected to the electric motor and to a second rotational speed reduction stage, the second rotational speed reduction stage being connected to the connection shaft.

Optionally, the aforementioned freewheel is arranged between a wheel of the second rotational speed reduction stage and the connection shaft.

For example, the disconnection system comprises a clutch controlled by the monitoring computer.

A variant may be to arrange not one, but two accessories driven by the power transmission box. In this case, the first accessory is disconnected from the connection shaft by the disconnection system when the electric motor becomes active in order to avoid mechanical power being taken by this first accessory.

According to one aspect, the first mechanical link may include a coupling member allowing a misalignment.

For example, such a coupling member can comprise two flanges connected by a hub or a deformable ring.

According to one aspect, the first connection member may include connecting splines engaged with receiving splines of the accessory.

According to one aspect, said second connection member may include connection splines engaged with drive splines of the electric motor.

According to one aspect, said assistance system may include at least one DC high-voltage battery which is electrically connected, directly or indirectly for example via the monitoring computer where appropriate, to the electric motor.

Such a high-voltage battery can for example be chosen from accumulator batteries of the rechargeable or non-rechargeable type, accumulator batteries of the bootable type or else from supercapacitors with organic electrolyte, with aqueous electrolyte, with ionic liquid, hybrid supercapacitors and pseudo-supercapacitors.

According to one aspect, the aircraft may include a low-voltage electrical network comprising at least one source of low-voltage electrical energy, said low-voltage electrical network having an electrical converter connected to said at least one electric battery.

Such a source of electrical energy at low electrical voltage can comprise a ground connection, an electrical generator such as equipment capable of fulfilling an electric generator function and a starter function of a heat engine, a low-voltage electric battery, etc.

Under these conditions, the low-voltage electrical network can electrically supply the electric motor if necessary.

BRIEF DESCRIPTION OF THE DRAWINGS

The invention and its advantages will emerge in more detail in the context of the description which follows with examples given by way of illustration with reference to the appended figures, which show.

Elements which are present in several distinct figures are assigned a single reference.

DETAILED DESCRIPTION OF THE INVENTION

Figure 1:
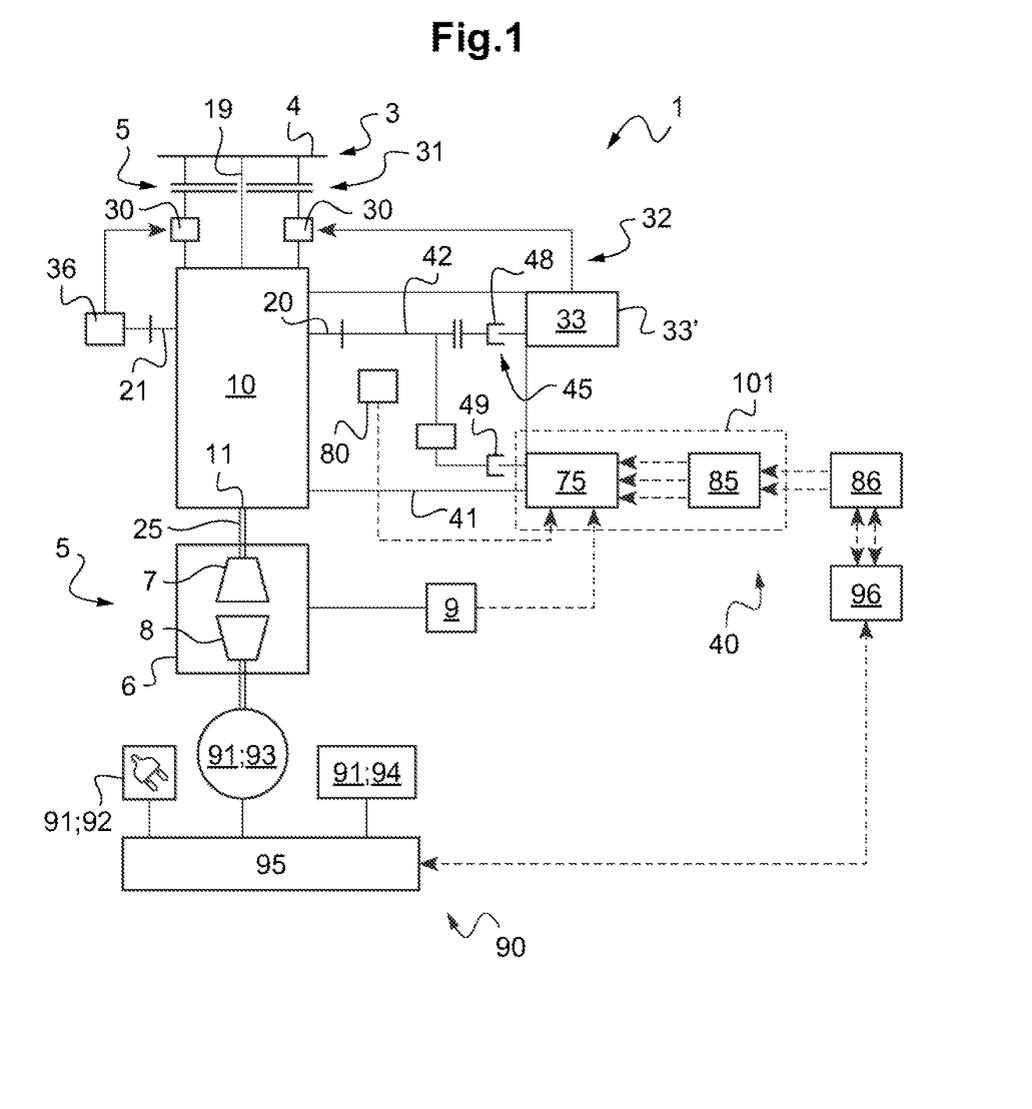
FIG. 1, a diagram illustrating an aircraft according to the invention.

FIG. 1 shows a diagram illustrating an aircraft 1 according to the invention. The aircraft 1 is provided with a rotary airfoil 3. The rotary airfoil 3 has a plurality of blades 4.

In order to set the blades 4 in rotation around an axis of rotation of the rotary airfoil 3, the aircraft 1 is provided with a power plant 5.

This power plant 5 comprises at least one heat engine 6. Optionally, this power plant 5 is a single-engine installation comprising a single heat engine 6. The heat engine(s) 6 are internal combustion engines. According to the illustrated example, the heat engine(s) 6 are turboshaft engines having a gas generator 8 and a working turbine 7, and in particular a free working turbine 7 according to this example. Alternatively, the heat engine(s) 6 are, for example, piston engines.

This heat engine 6 can be controlled and monitored in the usual way by an engine computer 9 and multiple usual sensors, not shown.

A computer may for example comprise at least one processor and at least one memory, at least one integrated circuit, at least one programmable system, at least one logic circuit, these examples not limiting the scope given to the expression "computer." The term "processor" can denote a central processing unit known by the acronym CPU, a graphics processing unit GPU, a digital unit known by the acronym DSP, a microcontroller, etc.

Furthermore, the power plant 5 comprises a power transmission box 10 which is set in motion by the heat engine(s) 6. The power transmission box 10 is further connected to the rotary airfoil 3 in order to set this rotary airfoil 3 in rotation under the impulse of a heat engine 6 in a normal operating mode.

Figure 2:
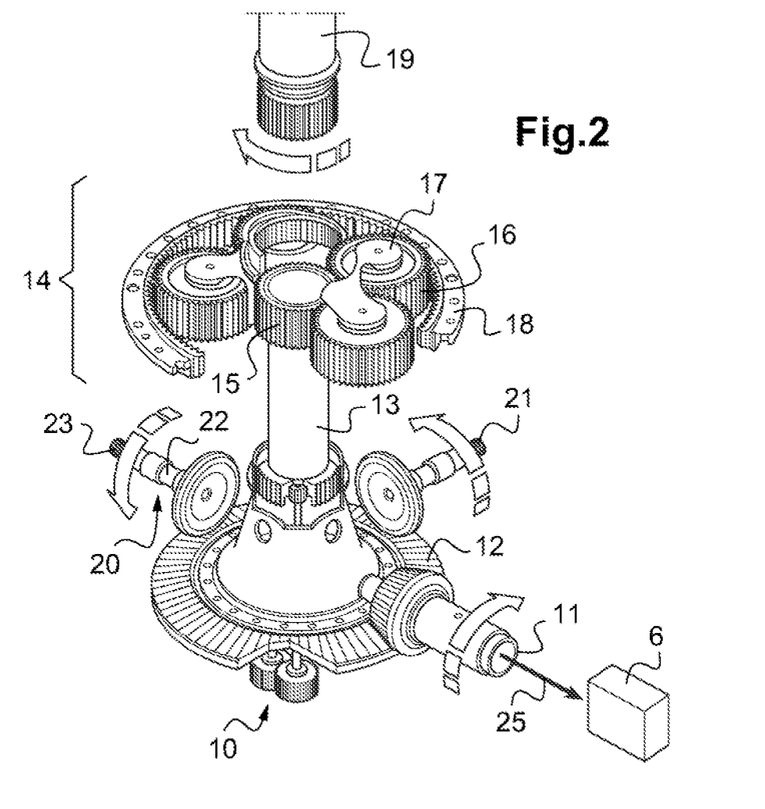
FIG. 2, a partial internal view of the power transmission box of the aircraft of FIG. 1, FIG. 3, an external view of the power transmission box of the aircraft of FIG. 1 equipped with an assistance system according to the invention, FIG. 4, a three-dimensional view of a connection module according to the invention, FIG. 5, a diagram illustrating the connection module according to the invention, and FIG. 6, a view of a sensor allowing fault detection having a tone wheel and an inductive sensor.

The power transmission box 10 may be of a conventional type. FIG. 2 illustrates an example of a power transmission box 10.

This transmission box 10 comprises an input shaft 11 which is mechanically linked to the heat engine 6 by a mechanical input link 25. The mechanical input link 25 can include a freewheel or the like, at least one shaft, at least one coupling means allowing a misalignment, etc. This input shaft 11 can set in motion rotating members of the power transmission box 10 so as to drive a main output shaft 19 in rotation, rotating the rotary airfoil 3. Such a main output shaft 19 can be connected to a rotor mast of the rotary airfoil 3 or be a part of this rotor mast.

For example, the input shaft 11 meshes with a wheel 12 sometimes referred to as a large wheel for convenience and because of its dimensions. This large wheel 12 is secured in rotation with an internal shaft 13 setting in motion at least one epicyclic speed reduction stage 14. For example, this epicyclic speed reduction stage 14 includes a planetary gear 15 which is secured to the internal shaft 13. In addition, this epicyclic speed reduction stage 14 comprises a plurality of differential-pinion gears 16 which roll both on the planetary gear 15 and on a fixed outer ring gear 18. The differential-pinion gears 16 are carried by a planet carrier 17 which meshes with the main output shaft 19, through a set of splines for example.

Furthermore, the power transmission box 10 may include at least one secondary output shaft 20, 21 for setting at least one accessory 33, such as a first hydraulic pump 33', in motion. For example, at least one secondary output shaft 20, 21 is meshed with by the large wheel 12. At least one secondary output shaft 20, 21 may include a fuse section 22 and/or splines 23

According to another aspect and with reference again to FIG. 1, the pitch of the blades 4 of the rotary airfoil 3 can be controlled by flight controls. For example, the aircraft 1 comprises a usual set of swashplates 31 provided with a non-rotating plate and a rotating plate, the rotating plate being connected to each blade 4 or to each blade sleeve via a pitch connecting rod.

In addition, the aircraft 1 may include hydraulic servo controls 30 having at least one movable body and a fixed rod or a movable rod and at least one fixed body. Each servo control 30 is thus articulated to the non-rotating plate and to a non-rotating member of the aircraft 1. For example, each servo control 30 is provided with a control lever which is connected to the flight controls, a movement of the control lever making it possible for example to move a slide valve of the servo control.

To supply each body of the servo controls 30 hydraulically, the aircraft 1 comprises a hydraulic circuit 32. This hydraulic circuit 32 comprises at least a first hydraulic pump 33' which is set in motion by a secondary output shaft 20 of the power transmission box 10. The first hydraulic pump 33' is in fluid communication with at least one body of the servo controls 30.

Optionally, the hydraulic circuit 32 comprises at least one second hydraulic pump 36 which is set in motion by another secondary output shaft 21 of the power transmission box 10

Figure 3:
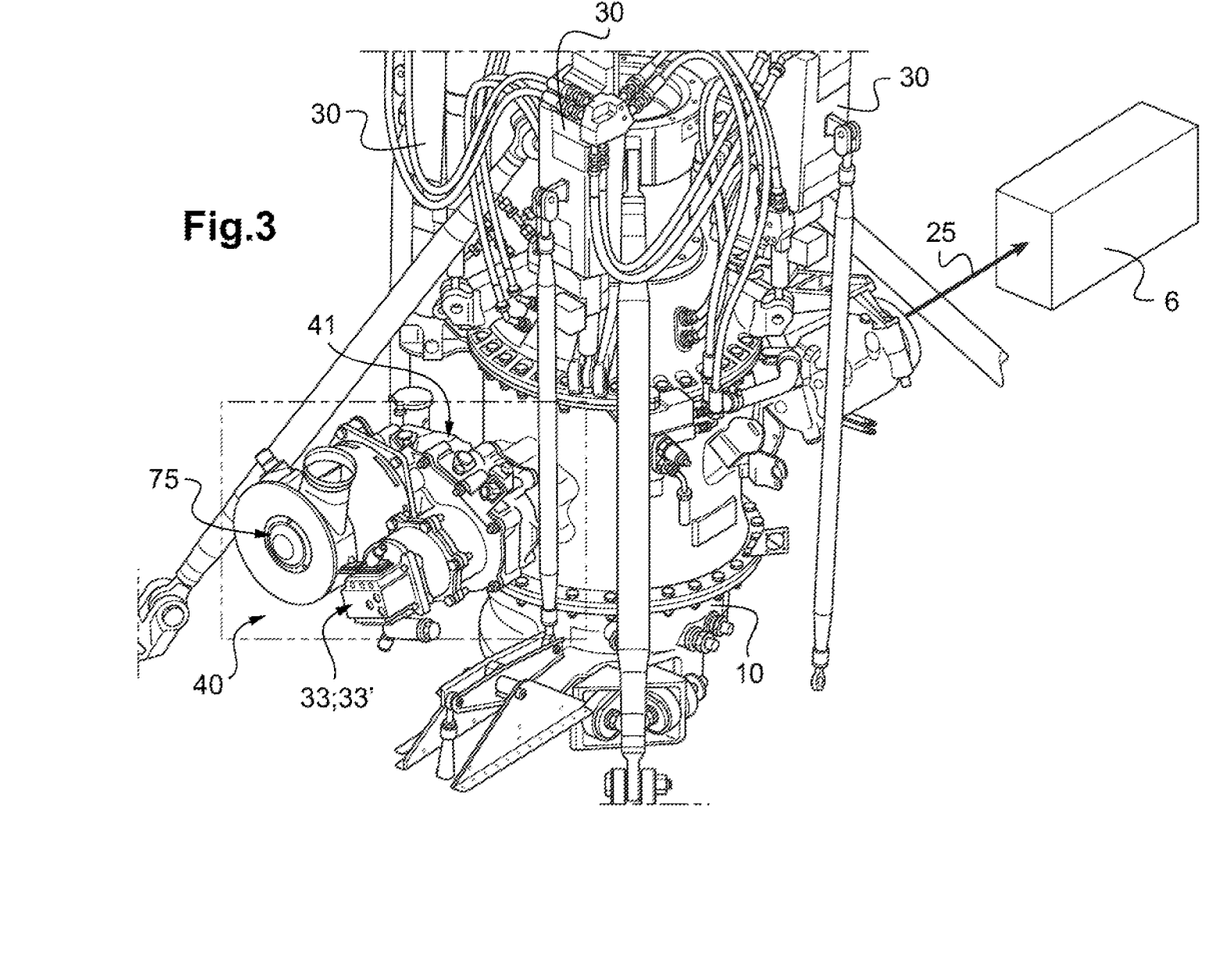

According to another aspect and with reference to FIG. 3, the aircraft 1 comprises an assistance system 40 for assisting a pilot in a degraded operating mode in the event of failure of a heat engine 6.

This assistance system 40 is provided with an electric motor 75. Such an electric motor 75 is formed by an irreversible motor operating only in motor mode, and therefore cannot be used to generate electrical energy.

In addition, the assistance system 40 is provided with a mechanical connection module 41 which makes it possible to mechanically connect the electric motor 75 and the first hydraulic pump 33' to the same secondary output shaft 20 of the power transmission box 10.

Figure 4:
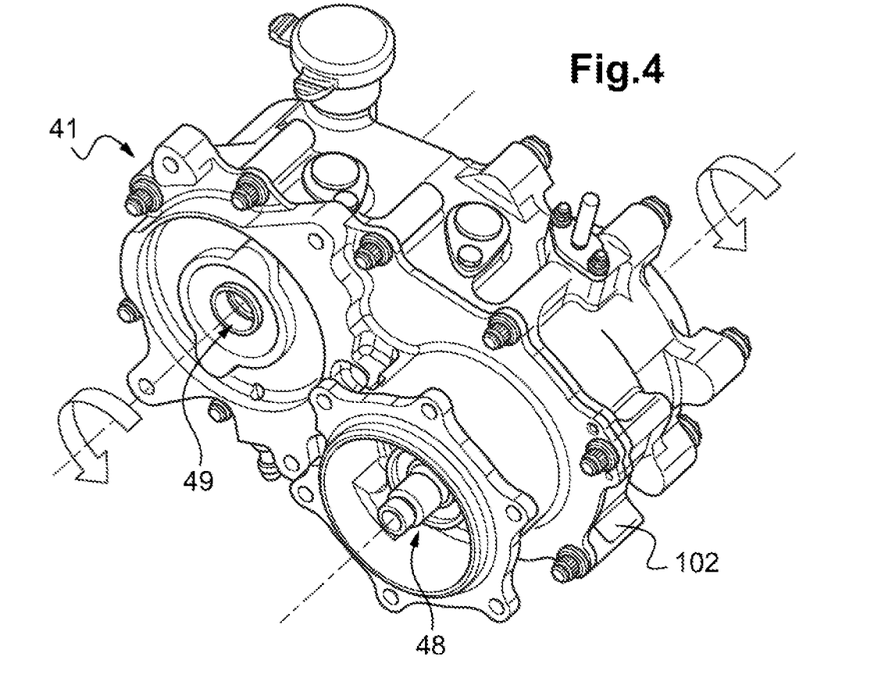
Figure 5:
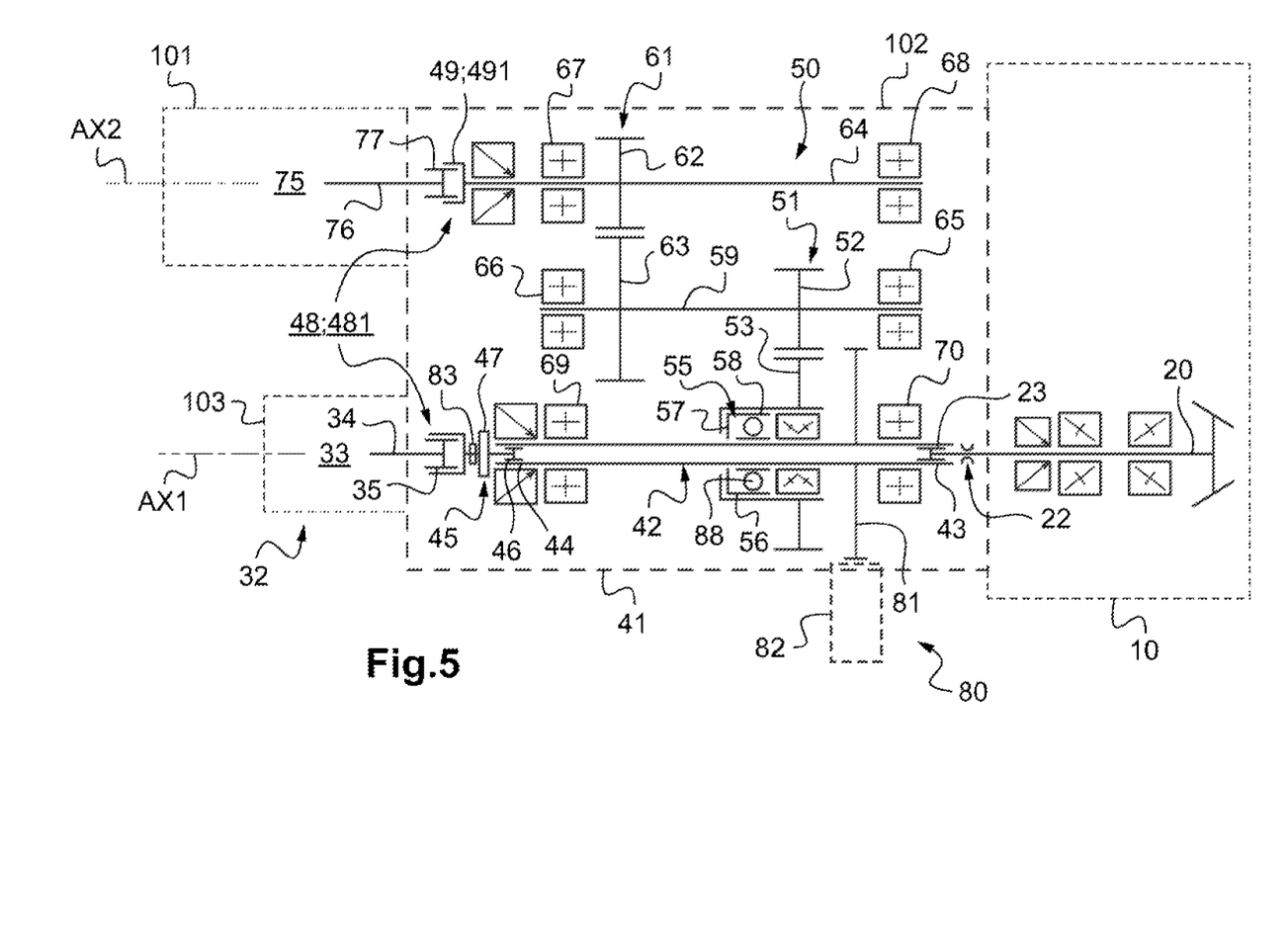

FIGS. 4 and 5 illustrate such a mechanical connection module 41.

In particular, FIG. 5 shows a diagram illustrating an embodiment of the mechanical connection module 41.

This mechanical connection module 41 has a connection shaft 42 which is mechanically connected to the secondary output shaft 20. For example, the connection shaft 42 is fitted with splines 43 that are engaged with splines 23 of the secondary output shaft 20. This connection shaft 42 can also be guided by at least two rolling members 69, 70.

In addition, the mechanical connection module 41 is provided with a first connection member 48 which is connected to the first hydraulic pump 33'. According to the illustrated example, the first connection member 48 comprises connecting splines 481 engaged on receiving splines 35 of a drive shaft 34 of the first hydraulic pump 33'.

The first connection member 48, and in this case the connecting splines 481 according to the illustrated example, is connected by a first mechanical link 45 internal to the connection shaft 42.

Such a first mechanical link 45 can be reduced to its simplest expression by showing a means for securing the first connection member 48 to the connection shaft 42, such as a welding means for example. If necessary, the connection shaft 42 can be machined to present the connection splines 481.

According to another example, the first mechanical link 45 may comprise at least one linking shaft and/or a disconnection system 83 and/or a coupling member 47 and/or splines 46 engaged on splines 44 of the connection shaft 42.

In particular, the first mechanical link 45 may include a coupling member 47 allowing a misalignment between two mechanical members. According to one example, such a coupling member 47 may comprise a first flange secured to the connection shaft 42, directly or indirectly via splines 46 engaged on splines 44 of the connection shaft 42, and a second flange linked by a flexible member to the first flange. The flexible member can allow an axial and/or radial misalignment between the flanges.

The second flange can be connected directly or indirectly to the first connection member 48

In a complementary or alternative manner, a disconnection system 83 can be configured to disconnect the first hydraulic pump 33' from the connection shaft 42 in the event of a breakdown of a heat engine 6. Such a disconnection system 83 may in particular be requested when the hydraulic circuit 32 comprises a second hydraulic pump 36 which is set in motion by the power transmission box 10. Such a disconnection system 83 may for example comprise a clutch.

According to the illustrated example, the first mechanical link 45 thus successively comprises splines 46 engaged on splines 44 of the connection shaft, a linking shaft connecting the splines 46 to a coupling member 47, a disconnection system 83, then the first connection member 48.

According to another aspect, the mechanical connection module 41 comprises a second connection member 49 which is connected to the electric motor 75. According to the illustrated example, the second connection member 49 comprises connection splines 491 engaged on drive splines 77 of an output motor shaft 76 of the electric motor 75.

The second connection member 49, and in this case the connection splines 491 according to the illustrated example, is connected by a second mechanical link 50 internal to the connection shaft 42. The second connection member 49 can be movable in rotation about a second axis AX2 parallel to a first axis AX1 about which the first connection member 48 is movable in rotation. Optionally, the connection shaft is also movable in rotation about the first axis of rotation AX1.

The second mechanical link 50 can be reduced to its simplest expression or can optionally comprise at least one speed reduction gear stage 51, 61. By way of illustration, the electric motor 75 can be sized to drive its output motor shaft 76 in rotation at approximately 20,000 revolutions per minute while the connection shaft 42 is configured to perform a rotation at approximately 6,000 revolutions per minute.

According to the illustrated example, the second mechanical link 50 comprises a first speed reduction gear stage 61 setting in motion a second speed reduction gear stage 51 which is connected to the connection shaft 42.

For example, the second mechanical link 50 comprises a first internal shaft 64 which is integral with the second connection member 49. For example, the second connection member 49 includes splines of the first internal shaft 64. This first internal shaft 64 can be guided in rotation by at least two rolling members 67, 68. In addition, the first internal shaft 64 carries a first pinion 62 of the first stage 61.

The second mechanical link 50 may include a second internal shaft 59. This second internal shaft 59 can be guided in rotation by at least two rolling members 65, 66. In addition, the second internal shaft 59 carries a first wheel 63 of the first stage 61. The first wheel 63 is meshed with by the first pinion 62 and may include a number of teeth greater than the number of teeth of the first pinion 62. For example, the first pinion 62 has 18 teeth and the first wheel 63 has 37 teeth.

In addition, the second internal shaft 59 carries a second pinion 52 of the second stage 51. The second pinion 52 meshes with a second wheel 53 of the second stage 51, this second wheel 53 being connected to the connection shaft 42 directly or indirectly. The second wheel 53 may include a number of teeth greater than the number of teeth of the second pinion 52. For example, the second pinion 52 has 19 teeth and the second wheel 53 has 42 teeth.

According to one aspect, the second mechanical link 50 may include a freewheel 55. This freewheel 55 has the function of transmitting mechanical power only from the electric motor 75 to the connection shaft 42.

Usually, the freewheel 55 comprises a driving part 56, a driven part 57 and at least one connection member 58 interposed between the driving part 56 and the driven part 57 so as to connect them in rotation when the driving part 56 tends to perform a rotation at a speed greater than or equal to the driven part 57. For example, a connection member 58 can take the form of a ball, a roller, a pawl, etc.

According to the illustrated example, the driving part 56 can be secured to the second wheel 53 by usual means, such as screwing means, welding, splines, etc. Therefore, the driven part 57 can be secured to the connection shaft 42 by usual means, such as screwing means, welding, splines, etc.

According to another aspect, the electric motor 75 can be housed at least partially within an enclosure of a sub-assembly called "motor equipment 101" for convenience. For example, the output motor shaft 76 of the electric motor 75 comes out of this enclosure to enter the second connection member 49. The enclosure can include one or more parts that are fixed to one another.

Likewise, a casing 102 can be included in the mechanical connection module 41. Such a casing 102 thus makes it possible to at least partially accommodate the connection shaft 42 as well as the first mechanical link 45 and the second connection member 49. This casing 102 may include one or more parts fixed to one another.

According to the illustrated example, the casing 102 has an opening through which the secondary output shaft 20 passes, an opening through which the output motor shaft 76 passes and an opening through which the drive shaft 34 of the first hydraulic pump 33' passes.

In addition, the casing 102 can be fixed to the power transmission box 10, for example by screwing means. Likewise, an enclosure 103 of the first hydraulic pump 33' and an enclosure of the motor equipment 101 are each optionally fixed to the casing 102, for example by screwing means.

Furthermore, the assistance system 40 can comprise a sensor 80 so as to detect an engine failure of the heat engine 6. Optionally, this sensor 80 includes a rotational speed sensor emitting a signal which varies as a function of the rotational speed of the connection shaft 42.

Figure 6:
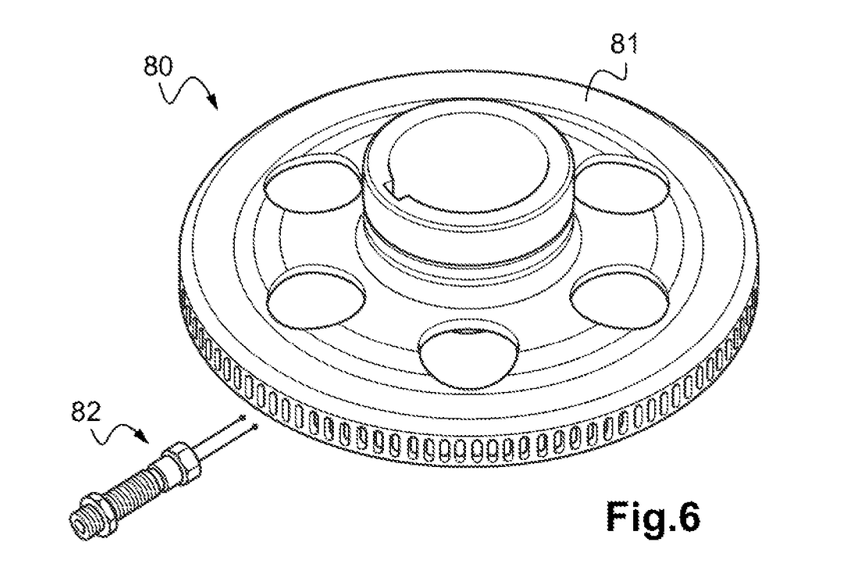

According to FIG. 6, the rotation speed sensor comprises a tone wheel 81 secured in the usual manner in rotation to the connection shaft 42. The tone wheel 82 comprises a wafer having a succession of holes and "teeth."

In addition, the speed sensor includes an inductive sensor 82 directed towards the tone wheel 81. This inductive sensor 82 can be carried by the casing 102. An inductive sensor 82 may include a coil mounted on a metal rod and a permanent magnet. The inductive sensor 82 is mounted opposite the tone wheel 81. The magnetic flux which occurs between the teeth or the holes of the tone wheel 81 allows the inductive sensor 82 to generate a sinusoidal electrical voltage which varies according to the speed of rotation of the connection shaft 42 and the distance separating the inductive sensor 82 from the tone wheel 81. According to one example, the tone wheel 81 has 94 holes and the sensor 82 is a sensor from the company Honeywell® known under the trade name MA3055.

According to another aspect and with reference again to FIG. 1, the assistance system 40 has a monitoring computer 85 which is connected to the electric motor 75. The monitoring computer 85 may be part of the motor equipment 101.

The monitoring computer 85 can be connected by wired or non-wired links, where appropriate, to the sensor 80, to the motor computer 9 or even to the disconnection system 83 or to at least one man/machine interface.

In one aspect, the assistance system 40 may include at least one high-voltage DC electric battery 86 which is electrically connected to the electric motor 75.

The expression "high electrical voltage" refers to an electrical voltage greater than 50 volts, and for example 300 or 500 volts.

According to the example of FIG. 1, the high-voltage DC electric battery 86 is connected to the monitoring computer 85, this monitoring computer 85 electrically supplying the electric motor 75 if necessary.

According to one possibility, the aircraft 1 can also include a low-voltage electrical network 90. The expression "low electrical voltage" refers to an electrical voltage lower than 50 volts, and for example 28 volts. This low-voltage electrical network 90 can be provided with at least one source of low-voltage electrical energy 91. For example, said at least one source of low-voltage electrical energy 91 may comprise a ground connection 92 and/or an electric machine 93 possibly serving as an electric generator and starter for the heat engine 6 and/or a low-voltage electric battery 94. Each source of low-voltage electrical energy 91 can be electrically connected to an electrical distribution network 95. In addition, a low-voltage DC to high-voltage DV electrical converter 96 can be electrically connected to the electrical distribution network 95 and to each high-voltage DC electric battery 86.

Under these conditions, the electric motor 75 is inoperative during normal operating mode, except in the case of a test. When the monitoring computer 85 receives a signal from the sensor 80 or from the engine computer 9 signaling a failure of a heat engine, the monitoring computer 85 is configured to request the operation of the electric motor 75. For example, the sensor 80 continuously emits a signal carrying a current rotation speed of the connection shaft 42. Consequently, as soon as this current rotation speed is below a threshold or alternatively when a deceleration exceeds a threshold value, the monitoring computer 85 activates the electric motor 75.

The electric motor 75 is then activated to set the power transmission box 10 in motion and to participate in the rotation of the rotary airfoil 3.

Optionally, the monitoring computer 85 also disconnects the first hydraulic pump 33' depending on the variant.

The monitoring computer 85 can also activate the electric motor 75 by applying other logics, for example based on the teaching of the document U.S. Pat. No. 9,045,223.

The electric motor 75 can also be in a so-called "armed" configuration in which it is rotated prior to detecting a failure of a heat engine, but at a lower rotational speed than that allowing it to drive the connection shaft 42 in rotation.

Consequently, as soon as the monitoring computer 85 receives a signal from the sensor 80 or from the engine computer 9 signaling a failure of a heat engine, the rotation speed of the output motor shaft 76 of the electric motor 75 can be increased instantly to rotate the connection shaft 42 and to prevent its rotation speed from decreasing.

Of course, the present invention is subject to many variations in its implementation. Although several embodiments have been described, it will be understood that it is not conceivable to exhaustively identify all of the possible modes. It is of course conceivable to replace a described means by an equivalent means without departing from the scope of the present invention.

The invention claimed is:

1. An aircraft comprising:
    a rotary airfoil;
    a power transmission box provided with a main output shaft rotating the rotary airfoil;
    at least one heat engine connected by a mechanical input link to an input shaft of the power transmission box;
    at least one accessory which is set in motion by a secondary output shaft of the power transmission box;
    an assistance system, provided with a mechanical connection module, having:
        an electric motor;
        the mechanical connection module housed in a casing, the mechanical connection module comprising:
        a connection shaft which is connected to the secondary output shaft of the power transmission box;
        a first mechanical link positioned at least partially inside the connection shaft;
        a first spline assembly connected to the at least one accessory and connected to the connection shaft by the first mechanical link;
        a second mechanical link transmitting mechanical power only from the electric motor to the connection shaft;
        a second spline assembly connected to an electric motor output shaft and connected to the connection shaft by the second mechanical link,
    wherein, in an event of a failure of the at least one heat engine, the second mechanical link connects the connection shaft and the electric motor to transmit mechanical power to the main output shaft.

2. The aircraft according to claim 1, wherein the at least one accessory comprises at least one of a hydraulic pump, a mechanical fan, an electric generator and a pneumatic compressor.

3. The aircraft according to claim 2, wherein the hydraulic pump includes a first hydraulic pump connected to a hydraulic circuit of the aircraft, the hydraulic circuit being connected to a plurality of servo controls for controlling blade pitch of the rotary airfoil.

4. The aircraft according to claim 3, wherein the hydraulic circuit includes a second hydraulic pump which is set in motion by the power transmission box, wherein the first mechanical link has a disconnection system to disconnect the first hydraulic pump from the connection shaft in the event of the failure of the at least one heat engine.

5. The aircraft according to claim 1, wherein the assistance system includes a monitoring computer connected to the electric motor and to a sensor to detect the failure of the at least one heat engine, the monitoring computer programmed to request an operation of the electric motor if the failure of the at least one heat engine is detected.

6. The aircraft according to claim 5, wherein the sensor includes a rotational speed sensor emitting a signal which varies as a function of a rotational speed of the connection shaft.

7. The aircraft according to claim 6, wherein the rotational speed sensor includes a tone wheel which is rotatably secured to the connection shaft and an inductive sensor arranged opposite the tone wheel.

8. The aircraft according to claim 1, wherein the second mechanical link includes at least one speed reduction gear stage.

9. The aircraft according to claim 1, wherein the first mechanical link includes a coupling member allowing a misalignment between two mechanical members.

10. The aircraft according to claim 1, wherein the assistance system includes at least one high-voltage DC electric battery which is electrically connected to the electric motor.

11. The aircraft according to claim 10, wherein the aircraft includes a low-voltage electrical network comprising at least one source of low-voltage electrical energy, the low-voltage electrical network having an electrical converter connected to the at least one high-voltage DC electric battery.

12. An aircraft comprising:
    a rotary airfoil;
    a power transmission box with a main output shaft driven to rotate the rotary airfoil and a secondary output shaft to drive at least one accessory;
    at least one heat engine connected by a mechanical input link to an input shaft of the power transmission box;
    an assistance system positioned between the at least one accessory and the secondary output shaft, the assistance system comprising:
        an electric motor having an output shaft, wherein the electric motor is housed in an enclosure;
        a mechanical connection module housed in a casing, the mechanical connection module comprising:
        a connection shaft which is connected to the secondary output shaft;
        a first mechanical link positioned at least partially inside the connection shaft;

a first connection member connected to the at least one accessory and connected to the connection shaft by the first mechanical link;

a second connection member connected to the output shaft of the electric motor and connected to the connection shaft by a second mechanical link, wherein the second mechanical link transmits power only from the electric motor to the connection shaft;

wherein, in an event of failure of the at least one heat engine, the second mechanical link connects the output shaft of the electric motor to the connection shaft so that the electric motor transmits power to rotate the main output shaft, thereby rotating the rotary airfoil.

13. The aircraft according to claim 12, wherein the second mechanical link includes at least one speed reduction gear stage.

14. The aircraft according to claim 12, wherein:
the first connection member comprises a first spline assembly including connecting splines engaged with receiving splines of the at least one accessory and,
wherein the second connection member comprises a second spline assembly including connection splines engaged with drive splines of the electric motor.

15. The aircraft according to claim 12, wherein the casing has a first opening through which the secondary output shaft extends and a second opening through which the output shaft of the electric motor extends.

16. The aircraft according to claim 12, wherein the second mechanical link includes a freewheel, wherein the freewheel connects the output shaft of the electric motor to the connection shaft so that the electric motor transmits power in the event of the failure of the at least one heat engine.

17. The aircraft according to claim 12, wherein, in the event of the failure of the at least one heat engine, the first mechanical link is configured to disconnect the at least one accessory from the connection shaft.

18. The aircraft according to claim 12, wherein the at least one accessory comprises at least one of a hydraulic pump, a mechanical fan, an electric generator and a pneumatic compressor.

19. The aircraft according to claim 12, wherein the casing is fixed to the power transmission box and wherein the at least one accessory and the enclosure of the electric motor are fixed to the casing.

20. An aircraft comprising:
a rotary airfoil;
a power transmission box provided with a main output shaft rotating the rotary airfoil;
at least one heat engine connected by a mechanical input link to an input shaft of the power transmission box;
at least one accessory which is set in motion by a secondary output shaft of the power transmission box;
an electric motor housed in a motor enclosure and having a motor output shaft;
a mechanical connection module housed in a casing, wherein the casing is fixed to the power transmission box and wherein the at least one accessory and the motor enclosure are fixed to the casing, the mechanical connection module comprising:
a connection shaft connected to the secondary output shaft of the power transmission box;
a first mechanical link positioned at least partially internal to the connection shaft;
a freewheel that connects the connection shaft and the electric motor to transmit mechanical power only to the main output shaft;
a first spline assembly connected to the at least one accessory and connected to the connection shaft by the first mechanical link;
a second spline assembly connected to the motor output shaft of the electric motor and connected to the connection shaft by the freewheel;
wherein, in an event of a failure of the at least one heat engine, the freewheel connects the motor output shaft to the connection shaft so that the electric motor transmits power to rotate the main output shaft, thereby rotating the rotary airfoil.

\* \* \* \* \*